Figure 1:
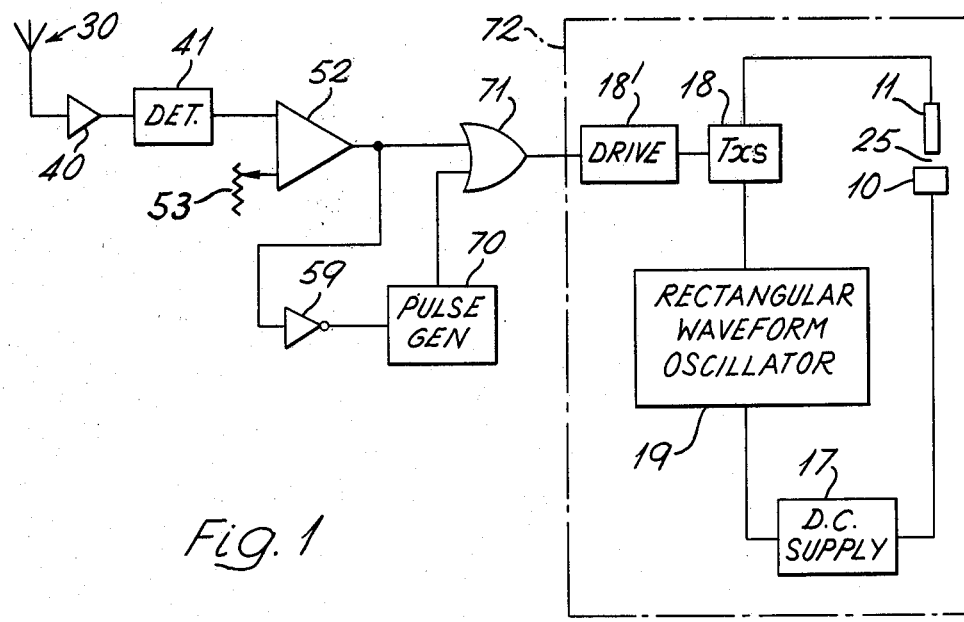

United States Patent [19]

Bhattacharyya et al.

[11] 4,346,278
[45] Aug. 24, 1982

[54] METHODS AND APPARATUS FOR ELECTRICAL DISCHARGE MACHINING

[75] Inventors: Sushantha K. Bhattacharyya; Mohamed F. El-Menshawy, both of Birmingham, England

[73] Assignee: National Research Development Corporation, London, England

[21] Appl. No.: 154,411

[22] PCT Filed: Dec. 8, 1978

[86] PCT No.: PCT/GB78/00051
§ 371 Date: Aug. 13, 1979
§ 102(e) Date: Aug. 6, 1979

[87] PCT Pub. No.: WO79/00379
PCT Pub. Date: Jun. 28, 1979

[30] Foreign Application Priority Data
Dec. 13, 1977 [GB] United Kingdom ............... 51713/77

[51] Int. Cl.³ .............................................. B23P 1/02
[52] U.S. Cl. ............................. 219/69 M; 219/69 C; 219/69 P
[58] Field of Search ................... 219/69 C, 69 P, 69 M

[56] References Cited
U.S. PATENT DOCUMENTS 3,087,044  4/1963  Inoue ................................. 219/69 C
3,705,286 12/1972  Kondo et al. ....................... 219/69 C
3,729,610  4/1973  Kondo ................................ 219/69 C

FOREIGN PATENT DOCUMENTS 997364   7/1965  United Kingdom .
1202748  8/1970  United Kingdom .
1323968  7/1973  United Kingdom .
1330418  9/1973  United Kingdom .
1334600 10/1973  United Kingdom .
1413893 11/1975  United Kingdom .
1425825  2/1976  United Kingdom .
1460165 12/1976  United Kingdom .
1464477  2/1977  United Kingdom .
1468367  3/1977  United Kingdom .
1492027 11/1977  United Kingdom .
1494992 12/1977  United Kingdom .

OTHER PUBLICATIONS

Alfred M. Maillet, "The Repercussions in Engineering Caused by a New Principle of Electro-Discharge", published by Society of Manufacturing Engineers, 1971.

Primary Examiner—C. C. Shaw
Attorney, Agent, or Firm—Cushman, Darby & Cushman

[57] ABSTRACT

A method and apparatus for use in EDM are described. Known EDM techniques require the voltage applied between the electrode and the workpiece to be removed either periodically or after a predetermined integrated current has passed and the resulting interruptions add to the time required for machining. In the present invention the voltage is applied until an arc is imminent or is detected and then the voltage is removed for a time sufficient to allow de-ionization of the gap between the electrode and the workpiece to occur.

15 Claims, 2 Drawing Figures

METHODS AND APPARATUS FOR ELECTRICAL DISCHARGE MACHINING

The present invention relates to methods and apparatus for electrical discharge machining (EDM) otherwise known as spark erosion machining.

EDM machining according to known techniques has proceeded on the basis that once sparking has been initiated in the gap between the electrode of an EDM machine and a workpiece, the sparking inevitably degenerates into arcing unless the discharge is interrupted for example by removing the voltage applied across the gap for a time sufficient to allow de-ionization in the gap. Thus the voltage is applied as a series of pulses which are usually of predetermined duration or the pulse continues until the integrated gap current has reached a predetermined value.

The time taken for any machining operation is therefore considerably longer than theoretically necessary, since machining is not carried out in the intervals between voltage pulses.

An object of the present invention is to reduce the time required to carry out EDM machining operations.

According to a first aspect of the present invention there is provided an EDM machine comprising monitor means for providing a monitoring signal indicating the degree of sparking which occurs, during machining, in the gap between an electrode of the machine and a workpiece, characterized in that the machine comprises control means for repeatedly carrying out first and second operations, the first operation being the substantially continuous application of a voltage between the electrode and the workpiece to provide sparking in the gap, and the second operation, commencing when the monitoring signal indicates a low degree of sparking, being the removal of the said voltage for a time at least approaching that required for de-ionisation in the gap.

According to a second aspect of the present invention there is provided a method of electrical discharge machining comprising deriving a monitoring signal indicating the degree of sparking which occurs, during machining, in a gap between an electrode and a workpiece, characterized in that the method comprises repeatedly carrying out first and second operations, the first operation being the substantially continuous application of a voltage between the electrode and the workpiece to provide sparking in the gap, and the second operation, commencing when the monitoring signal indicates a low degree of sparking, being the removal of the said voltage for a time at least approaching that required for de-ionisation in the gap.

The present inventors have carried out photographic observations on electrical discharge in machining and have discovered that the discharge between the electrode and the workpiece during a voltage pulse is made up of a plurality of separate sparks during good machining and that machining deteriorates when a voltage pulse includes a period of arcing. Previously, it was thought that each pulse started with a spark which gave way to an arc. The inventors' discovery allows the continuous application of a voltage between the electrode and the workpiece, to be interrupted following the occurrence of arcing as indicated by monitoring.

Monitoring the discharge in the gap may be carried out by sensing energy emitted from the gap, for example by light radiation, or electromagnetic radiation (that is comprising the induction field and the radiation field) or as represented by the electrostatic or magnetic fields associated with voltages across, or currents in, the gap, provided, of course, that the signals derived by sensing in these ways distinguish between arcing and sparking. Where electromagnetic radiation is sensed an antenna in the vicinity of the gap may be used, and signals in the frequency ranges 16 to 24 MHz and 26 to 60 MHz, at least, have been found to provide a good distinction between arcing and sparking since the amplitude of the signals received is much higher during sparking than during arcing, and falls as sparking approaches arcing.

The differences in electromagnetic and light radiation from the gap are thought to be due to two mechanisms: firstly sparks are of comparatively short duration compared with arcs so that the rate of change of current in the gap is higher during sparking; and secondly, when ionisation takes place in arcing and sparking the energy levels of electrons concerned change in different ways. With arcing, where a comparatively large amount of energy is supplied, more and greater energy level changes take place, re-combination takes place less frequently and with electrons taking up an intermediate state more often than is sparking. More energy level changes, as occur in sparking where less energy is supplied, mean greater magnitude and higher frequency electro-magnetic radiation, while more electrons taking up an intermediate energy level, as occur in arcing, mean more light emitted and light of different frequencies.

In addition while during arcing light is generated substantially continuously, during sparking generation is intermittent and corresponds with the sparks. Thus the intermittent nature of light emission during sparking can be used to generate a monitoring signal.

As another alternative in monitoring the discharge in the gap, a circuit may be connected directly or indirectly to the electrode and/or the workpiece to sense radio frequency signals in the voltage across the gap or the current in the gap. The amplitudes of signals in the ranges 5 to 10 MHz and 25 to 30 MHz have been found to be much higher during sparking than during arcing, and again these amplitudes fall as sparking approaches arcing.

Other ways of distinguishing between sparking and arcing may be used, for example the voltage across the gap may be monitored since there is a small reduction in this voltage when a change from sparking to arcing takes place.

Figure 2:
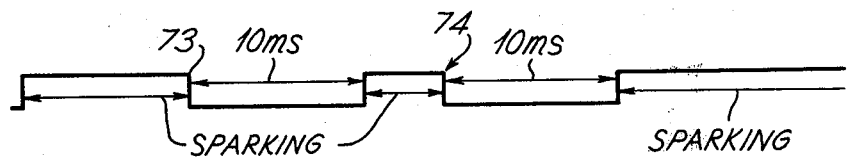

Certain embodiments of the invention will now be described, by way of example, with reference to the accompanying drawings, in which:

FIG. 1 is a block diagram of some electrical circuits of an EDM machine according to the invention, and FIG. 2 shows waveforms appearing in the circuit of FIG. 1.

In FIG. 1 an antenna 30 is located in the region of the gap 25 between an electrode 11 and a workpiece 10 of an EDM machine, or around a tank which contains dielectric liquid in which the electrode and workpiece are submerged. The antenna is coupled by way of an amplifier 40 to a detector 41 which may simply comprise a series diode and a shunt capacitor. The amplifier 40 has an output signal amplitude dependent on input signal amplitude and preferably has a linear gain characteristic. The amplifier is frequency selective and is tuned to accept signals at about 30 MHz.

The detector 41 is coupled to one input of a comparator circuit 52 which also receives an adjustable reference level derived from a potentiometer 53. The output of the comparator 52 is connected by way of an OR gate 71 to a drive circuit 18' for a group of transistors 18 which when conductive apply current and voltage from a d.c. power supply 17 to the gap 25. An optional rectangular waveform oscillator 19 is also shown in FIG. 1 but the function and operation of this oscillator is described later.

The output of the comparator 52 is also connected by way of an inverter 59 to trigger a pulse generator 70, which 10 milliseconds after receiving an input from the inverter 59 passes a pulse to the OR gate 71.

In operation when machining is to be carried out, there is no spark across the gap and therefore practically no radiation at 30 MHz is received by the antenna 30. Thus the output of the comparator is zero and after a 10 millisecond delay the generator 70 is triggered to provide a pulse, which reaches the drive circuit 18' by way of the OR gate 71 and causes the transistor group 18 to conduct. Thus if conditions are correct for sparking, r.f. radiation at a high level commences and a signal from the comparator 52 maintains a signal causing the transistors of the group 18 to continue conduction. Sparking continues in the gap until, for example, an arc occurs at a time 73 in FIG. 2 which is a waveform at the output of the OR gate 71. The signal from the comparator then ceases and the transistor group 18 immediately ceases to conduct. The waveform of FIG. 2 now falls to zero and a ten millisecond interval ensues for the arc ionisation channel to disperse, the start of this interval being triggered by the comparator 52 by way of the inverter 59 and ending when the pulse generator 70 applies a start pulse to the OR gate 71. This process is continuous as indicated in FIG. 2 where the level at the output of the OR gate 71 during sparking is designated 'sparking'. A further arc occurring at a time 74 is also shown together with the subsequent cessation and reappearance of sparking.

Clearly the advantage of the arrangement of FIG. 1 is that very high machining efficiency can be obtained since there are no interruptions in sparking until arcs occur and then the interruptions are just sufficiently long for ionisation channels to disperse. The waveform shown in FIG. 2 is by way of illustration and in fact, of course, sparking would occur for a much greater portion of any machining time. Provision is made for flushing the gap if arcing cycles of short period occur continually.

Coarse and fine machining used at the beginning and end of a machining operation are often controlled by using long machining pulses to start and short pulses at the end. Thus adjustment is not available in the arrangement of FIG. 1, since drive is applied at all times in which sparking occurs. However coarse and fine machining is achieved by adjustment of the power applied to the gap, for example by controlling the number of transistors in operation in the group 18.

The arrangement of FIG. 1 may include the oscillator 19 which has a rectangular output waveform. The function of this oscillator is to superimpose an oscillatory voltage, for example in the frequency range 50 to 100 KHz, on the gap voltage with the object of supporting the sparking condition. Since the oscillator 19 is connected in series with the group of transistors 18, it applies its output voltage to the gap 25 only when voltage from the supply 17 is also applied to the gap. In a typical arrangement the voltage applied across the gay by the d.c. supply is 85 volts and the superimposed voltage has an amplitude of 15 volts.

The arrangements of FIG. 1 can be further modified by replacing the d.c. supply 17 and the groups of transistors 18 and 19 by an SCR bridge (not shown) with an a.c. supply connected across two terminals and the electrode and workpiece connected across opposite terminals. The four SCRs of the bridge are then directly triggered by the output from the gate 71 by way of a drive circuit but of course only those correctly poled by the supply at that time conduct. The SCRs can be replaced by SCSs with the advantage that arcing can be made to cease directly it is detected by switching off those SCSs which are conducting.

It will be appreciated that while specific embodiments of the invention have been described the invention can be put into practice in many other ways, for instance by using different circuits to distinguish between sparking and arcing and to control the application of voltage across the gap.

We claim:

1. An E.D.M. machine comprising:
   an electrode;
   means for applying a voltage between the electrode and a workpiece to provide, during machining, sparking in a gap between the electrode and the workpiece;
   monitoring means for providing a monitoring signal representative of the degree of sparking which occurs, during machining, in the gap; and
   control means for causing the means for applying a voltage to repeatedly carry out first and second operations, the first operation being the application of a substantially continuous voltage to the gap, and the second operation, commencing when the monitoring signal indicates a low degree of sparking, being the removal of the said substantially continuous voltage for an interval.

2. An E.D.M. machine according to claim 1 wherein the monitoring signal indicates when sparking has ceased, and the second operation commences when sparking has ceased.

3. An E.D.M. machine according to claim 1 wherein the monitoring means comprises an antenna positioned to receive electromagnetic radiation from the gap, and means for deriving the monitoring signal from signals received by the antenna.

4. An E.D.M. machine according to claim 1 wherein the monitoring means comprises an electrical connection to the electrode and/or the workpiece, and means for deriving the monitoring signal from signals received by way of the said electrical connection.

5. An E.D.M. machine according to claim 1 wherein the means for applying a voltage comprises a d.c. supply connected, in operation, by way of switching means across the gap, the control means controlling conduction by the switching means in accordance with the monitoring signal, and the E.D.M. machine includes means for superimposing an oscillatory voltage on the voltage applied across the gap, the amplitude of oscillatory voltage being small compared with the magnitude of the voltage applied across the gap by the d.c. supply.

6. An E.D.M. machine according to claim 5 wherein the repetition frequency of the oscillatory voltage is in the range 50 to 100 KHz.

7. An E.D.M. machine according to claim 1 wherein the said interval is at least sufficient to allow de-ionisation in the gap.

8. An E.D.M. machine according to claim 1 wherein the conrol means is constructed to cause a voltage to be applied to the gap whenever the monitoring signal indicates a degree of sparking which is above a predetermined level, and also to cause a test voltage to be applied to the gap after a first predetermined interval has elapsed since voltage was last applied to the gap, the test voltage being applied for a second interval sufficient to allow sparking to commence and for the monitoring signal to indicate the degree of sparking.

9. An E.D.M. machine according to claim 8 wherein the means for applying a voltage comprises a d.c. supply connected, in operation, by way of switching means across the gap, and the control means comprises a comparator for providing a first control signal when the monitoring signal indicates that sparking is above the predetermined level, a pulse generator which, in operation, is triggered by the absence of the first control signal to generate a second control signal after the said first predetermined interval has elapsed, and OR-gate means connected to receive the first and second control signals as inputs and to cause the switching means to conduct only when the first or second control signals are present.

10. An E.D.M. machine according to claim 8 wherein the control means is constructed to so operate that the first operation includes the application of the test voltage, the test voltage being extended, if sparking is above the predetermined level, to allow machining to take place and continue until the monitoring signal indicates that sparking has fallen below the predetermined level.

11. A method of E.D.M. machining comprising:
repeatedly carrying out first and second operations, the first operation being the application of a substantially continuous voltage between an electrode and a workpiece to provide sparking in a gap between the electrode and the workpiece, and the second operation being the removal of the said substantially continuous voltage for an interval; and
deriving a monitoring signal representative of the degree of sparking in the gap, the second operation commencing when the monitoring signal indicates that sparking in the gap is below a predetermined level.

12. A method of electrical discharge machining according to claim 11 wherein the monitoring signal indicates when sparking has ceased, and the second operation commences when sparking has ceased.

13. A method according to claim 11 wherein the said interval is at least sufficient to allow ionisation in the gap to disperse.

14. A method according to claim 11 wherein a test voltage is applied to the gap when a first predetermined interval has elapsed since voltage was last applied to the gap, the test voltage being applied for a second pedetermined interval sufficient to allow sparking to commence and for the monitoring signal to indicate the degree of any such sparking.

15. Control means for use with an EDM machine of the type which comprises machining means for applying a voltage between an electrode and a workpiece to provide sparking in a gap between the electrode and the workpiece, and monitoring means for providing a monitoring signal representative of the degree of sparking which occurs, during machining, in the gap, the control means comprising:
first means constructed to cause the machining means of a machine of the said type to carry out first operations in which a substantially continuous voltage is applied to the gap, and
second means for carrying out second operations in which the said continuous voltage is removed for an interval,
the first and second operations being, in operation, repeatedly carried out with each second operation commencing when a monitoring signal in operation provided by the monitoring means of the said machine, indicates a low degree of sparking related to the onset of arcing.

* * * * *